US011243774B2

(12) United States Patent
Cuffney et al.

(10) Patent No.: US 11,243,774 B2
(45) Date of Patent: Feb. 8, 2022

(54) DYNAMIC SELECTION OF OSC HAZARD AVOIDANCE MECHANISM

(71) Applicant: INTERNATIONAL BUSINESS MACHINES CORPORATION, Armonk, NY (US)

(72) Inventors: James Raymond Cuffney, Poughkeepsie, NY (US); Adam Collura, Hopewell Junction, NY (US); James Bonanno, Wappingers Falls, NY (US); Edward Malley, New Rochelle, NY (US); Anthony Saporito, Highland, NY (US); Jang-Soo Lee, Poughkeepsie, NY (US); Michael Cadigan, Jr., Poughkeepsie, NY (US); Jonathan Hsieh, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 16/359,380

(22) Filed: Mar. 20, 2019

(65) Prior Publication Data

US 2020/0301711 A1 Sep. 24, 2020

(51) Int. Cl.
*G06F 9/30* (2018.01)
*G06F 9/38* (2018.01)

(52) U.S. Cl.
CPC ........ *G06F 9/3838* (2013.01); *G06F 9/30021* (2013.01); *G06F 9/30043* (2013.01)

(58) Field of Classification Search
CPC . G06F 9/3838; G06F 9/30021; G06F 9/30043
(Continued)

(56) References Cited

U.S. PATENT DOCUMENTS

| 5,615,350 A | 3/1997 | Hesson et al. |
| 5,987,595 A | 11/1999 | Yoaz et al. |

(Continued)

FOREIGN PATENT DOCUMENTS

| JP | 11167516 A | 6/1999 |
| WO | 2011076602 A1 | 6/2011 |
| WO | 2013165754 A1 | 11/2013 |

OTHER PUBLICATIONS

Anonymous, "A Method and System for Precise Prediction of OSC Hazards Using Distance Comparison Between Store and Load Instructions," ip.com; IPCOM000234987D. Published Feb. 21, 2014. 4 pages.

(Continued)

*Primary Examiner* — Chun Kuan Lee
(74) *Attorney, Agent, or Firm* — Cantor Colburn LLP; Margaret McNamara

(57) ABSTRACT

Methods, systems and computer program products for dynamically selecting an OSC hazard avoidance mechanism are provided. Aspects include receiving a load instruction that is associated with an operand store compare (OSC) prediction. The OSC prediction is stored in an entry of an OSC history table (OHT) and includes a multiple dependencies indicator (MDI). Responsive to determining the MDI is in a first state, aspects include applying a first OSC hazard avoidance mechanism in relation to the load instruction. Responsive to determining that the load instruction is dependent on more than one store instruction, aspects include placing the MDI in a second state. The MDI being in the second state provides an indication to apply a second OSC hazard avoidance mechanism in relation to the load instruction.

17 Claims, 8 Drawing Sheets

(58) Field of Classification Search
USPC ........................................................ 712/216
See application file for complete search history.

(56) References Cited

U.S. PATENT DOCUMENTS

| | | | |
|---|---|---|---|
| 6,108,770 A * | 8/2000 | Chrysos | G06F 9/3838 |
| | | | 712/216 |
| 6,415,380 B1 | 7/2002 | Sato | |
| 6,622,237 B1 | 9/2003 | Keller et al. | |
| 6,651,161 B1 | 11/2003 | Keller et al. | |
| 6,694,424 B1 | 2/2004 | Keller et al. | |
| 7,062,638 B2 | 6/2006 | Yoaz et al. | |
| 7,290,121 B2 | 10/2007 | Kromer | |
| 7,415,597 B2 | 8/2008 | Filippo et al. | |
| 7,461,238 B2 | 12/2008 | Luick | |
| 7,603,527 B2 | 10/2009 | Hilly et al. | |
| 7,730,283 B2 | 6/2010 | Luick | |
| 7,975,130 B2 | 7/2011 | Alexander et al. | |
| 8,195,924 B2 | 6/2012 | Alexander et al. | |
| 8,285,947 B2 * | 10/2012 | Beaumont-Smith | G06F 9/384 |
| | | | 711/154 |
| 9,244,827 B2 | 1/2016 | Kim et al. | |
| 9,262,171 B2 | 2/2016 | Golla et al. | |
| 9,430,235 B2 | 8/2016 | Alexander et al. | |
| 9,495,156 B1 | 11/2016 | Alexander et al. | |
| 9,495,167 B2 | 11/2016 | Alexander et al. | |
| 9,600,289 B2 | 3/2017 | Meier et al. | |
| 9,619,750 B2 | 4/2017 | Kim et al. | |
| 9,626,189 B2 | 4/2017 | Busaba et al. | |
| 9,652,248 B2 | 5/2017 | Alexander | |
| 9,928,075 B2 | 3/2018 | Alexander et al. | |
| 10,013,257 B2 | 7/2018 | Hutton et al. | |
| 10,067,762 B2 | 9/2018 | Agarwal | |
| 10,073,789 B2 | 9/2018 | Chou | |
| 10,152,327 B2 | 12/2018 | Zeng | |
| 10,417,002 B2 | 9/2019 | Lloyd et al. | |
| 10,579,387 B2 | 3/2020 | Gonzalez et al. | |
| 2003/0074530 A1 | 4/2003 | Mahalingaiah et al. | |
| 2003/0149862 A1 * | 8/2003 | Kadambi | G06F 9/3838 |
| | | | 712/217 |
| 2004/0044881 A1 * | 3/2004 | Maier | G06F 9/3834 |
| | | | 712/218 |
| 2006/0095734 A1 | 5/2006 | Filippo et al. | |
| 2007/0022277 A1 | 1/2007 | Iwamura et al. | |
| 2008/0082765 A1 | 4/2008 | Hily et al. | |
| 2008/0276074 A1 | 11/2008 | Luick | |
| 2010/0325395 A1 * | 12/2010 | Burger | G06F 9/3838 |
| | | | 712/216 |
| 2010/0332806 A1 | 12/2010 | Golla et al. | |
| 2011/0153986 A1 | 6/2011 | Alexander et al. | |
| 2011/0185158 A1 | 7/2011 | Alexander et al. | |
| 2013/0326198 A1 | 12/2013 | Meier et al. | |
| 2014/0181482 A1 | 6/2014 | Smaus et al. | |
| 2015/0006452 A1 | 1/2015 | Kim et al. | |
| 2015/0089186 A1 | 3/2015 | Kim et al. | |
| 2017/0060755 A1 | 3/2017 | Chou | |
| 2017/0109170 A1 | 4/2017 | Alexander et al. | |
| 2017/0286119 A1 | 10/2017 | Al Sheikh et al. | |
| 2018/0081686 A1 | 3/2018 | Ho et al. | |
| 2018/0232234 A1 | 8/2018 | Alexander et al. | |
| 2019/0108031 A1 | 4/2019 | Gonzalez et al. | |
| 2019/0108034 A1 | 4/2019 | Lloyd et al. | |
| 2019/0310858 A1 | 10/2019 | Lloyd et al. | |
| 2020/0301710 A1 | 9/2020 | Alexander et al. | |

OTHER PUBLICATIONS

Anonymous, "Determining Most of the Non Duplicate Records in High Performance Environments in an Economical and Fault Tolerant Manner," ip.com; IPCOM000207132D. Published May 17, 2011. 28 pages.

Anonymous, "Method of Tracking Pseudo-Dependencies for use in Operand Store Compare Avoidance," ip.com; IPCOM000196518D. Published Jun. 4, 2010. 2 pages.

International Business Machines Corporation, "Method to Exclude Bad Patterns From a Pattern History Table Branch Predictor," ip.com, IPCOM000191968D. Published Jan. 19, 2010. 5 pages.

Castro et al., "Load-Store Queue Management: an Energy-Efficient Design Based on a State-Filtering Mechanism," International Conference on Computer Design, Oct. 2005, pp. 1-8.

Choi et al.; "Improving Value Prediction by Exploiting Both Operand and Output Value" Laboratory for Advanced . . . , 1999—pdfs.semanticscholar.org, 21 pages.

Chrysos et al.; "Memory Dependence Prediction Using Store Sets," IEEE, 1998, 12 pages.

List of IBM Patents or Patent Applications Treated as Related; Date Filed: Sep. 24, 2020; 2 pages.

Moshovos et al., "Streamlining Inter-operation Memory Communication via Data Dependence Prediction," IEEE, 1997, pp. 235-245.

Moshovos, "Memory Dependence Prediction," Dissertation, University of Wisconsin-Madison, 1998, 176 pages.

Onder et al.; "Dynamic Memory Disambiguation in the Presence of Out-of-Order Store Issuing", This work was supported by NSF grants CCR-0096122 and EIA-9806525 to The University of Arizona, 1999, 22 pages.

Reinman et al.; "Classifying Load and Store Instructions for Memory Renaming", Published i the Proceedings of the International Conference, Jun. 1999, 10 pages.

Subramaniam et al., "Store Vectors for Scalable Memory Dependence Prediction and Scheduling," IEEE, Jun. 16, 2020, pp. 64-75.

Tyson et al., "Improving the Accuracy and Performance of Memory Communication Through Reaming," IEEE, Proceedings of Micro-30, Dec. 1-3, 1997, 10 pages.

* cited by examiner

| Bit Position | Entry |
| --- | --- |
| 0:1 | (0,1) |
| 2 | 0 |
| 12:15 | MST IA for Store 1 |

304 — Bit Position
306 — 0:1, 2
310 — 12:15

FIG. 4A

| Bit Position | Entry |
| --- | --- |
| 0:1 | (0,1) |
| 2 | 1 |
| 12:15 | MST IA for Store 2 |

304 — Bit Position
306 — 0:1, 2
310 — 12:15

FIG. 4B

DYNAMIC SELECTION OF OSC HAZARD AVOIDANCE MECHANISM

BACKGROUND

The present invention generally relates to microprocessors, and more specifically, to dynamically selecting an OSC hazard avoidance mechanism.

A microprocessor that is capable of issuing and executing machine instructions out of order may permit loads to be executed ahead of stores. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. For example, the recovery process typically involves invalidating the load instruction that caused the violation and all newer instructions in program order beyond the load instruction, and second reissuing the load instruction. Conventional mechanisms for managing store-compare hazards can include the use of an operand-store-compare (OSC) history table (OHT) that remembers previously unknown dependencies between store and load instructions.

SUMMARY

Embodiments of the present invention are directed to a computer-implemented method for dynamically selecting an OSC hazard avoidance mechanism. A non-limiting example of the computer-implemented method includes receiving a load instruction that is associated with an operand store compare (OSC) prediction. The OSC prediction is stored in an entry of an OSC history table (OHT) and includes a multiple dependencies indicator (MDI). Responsive to determining the MDI is in a first state, the method includes applying a first OSC hazard avoidance mechanism in relation to the load instruction. Responsive to determining that the load instruction is dependent on more than one store instruction, the method includes placing the MDI in a second state. The MDI being in the second state provides an indication to apply a second OSC hazard avoidance mechanism in relation to the load instruction.

Embodiments of the present invention are directed to a system for dynamically selecting an OSC hazard avoidance mechanism. The system includes a memory having computer readable computer instructions, and a processor for executing the computer readable instructions. The computer readable instructions include instructions for receiving a load instruction that is associated with an operand store compare (OSC) prediction. The OSC prediction is stored in an entry of an OSC history table (OHT) and includes a multiple dependencies indicator (MDI). Responsive to determining the MDI is in a first state, the computer readable instructions include instructions for applying a first OSC hazard avoidance mechanism in relation to the load instruction. Responsive to determining that the load instruction is dependent on more than one store instruction, the computer readable instructions include instructions for placing the MDI in a second state. The MDI being in the second state provides an indication to apply a second OSC hazard avoidance mechanism in relation to the load instruction.

Embodiments of the invention are directed to a computer program product for dynamically selecting an OSC hazard avoidance mechanism, the computer program product comprising a computer readable storage medium having program instructions embodied therewith. The computer readable storage medium is not a transitory signal per se. The program instructions are executable by a processor to cause the processor to perform a method. A non-limiting example of the method includes receiving a load instruction that is associated with an operand store compare (OSC) prediction. The OSC prediction is stored in an entry of an OSC history table (OHT) and includes a multiple dependencies indicator (MDI). Responsive to determining the MDI is in a first state, the method includes applying a first OSC hazard avoidance mechanism in relation to the load instruction. Responsive to determining that the load instruction is dependent on more than one store instruction, the method includes placing the MDI in a second state. The MDI being in the second state provides an indication to apply a second OSC hazard avoidance mechanism in relation to the load instruction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A depicts an example entry for a first issuance of Load 2 according to one or more embodiments of the present invention;

FIG. 4B depicts an example entry for a second issuance of Load 2 according to one or more embodiments of the present invention;

Figure 1:
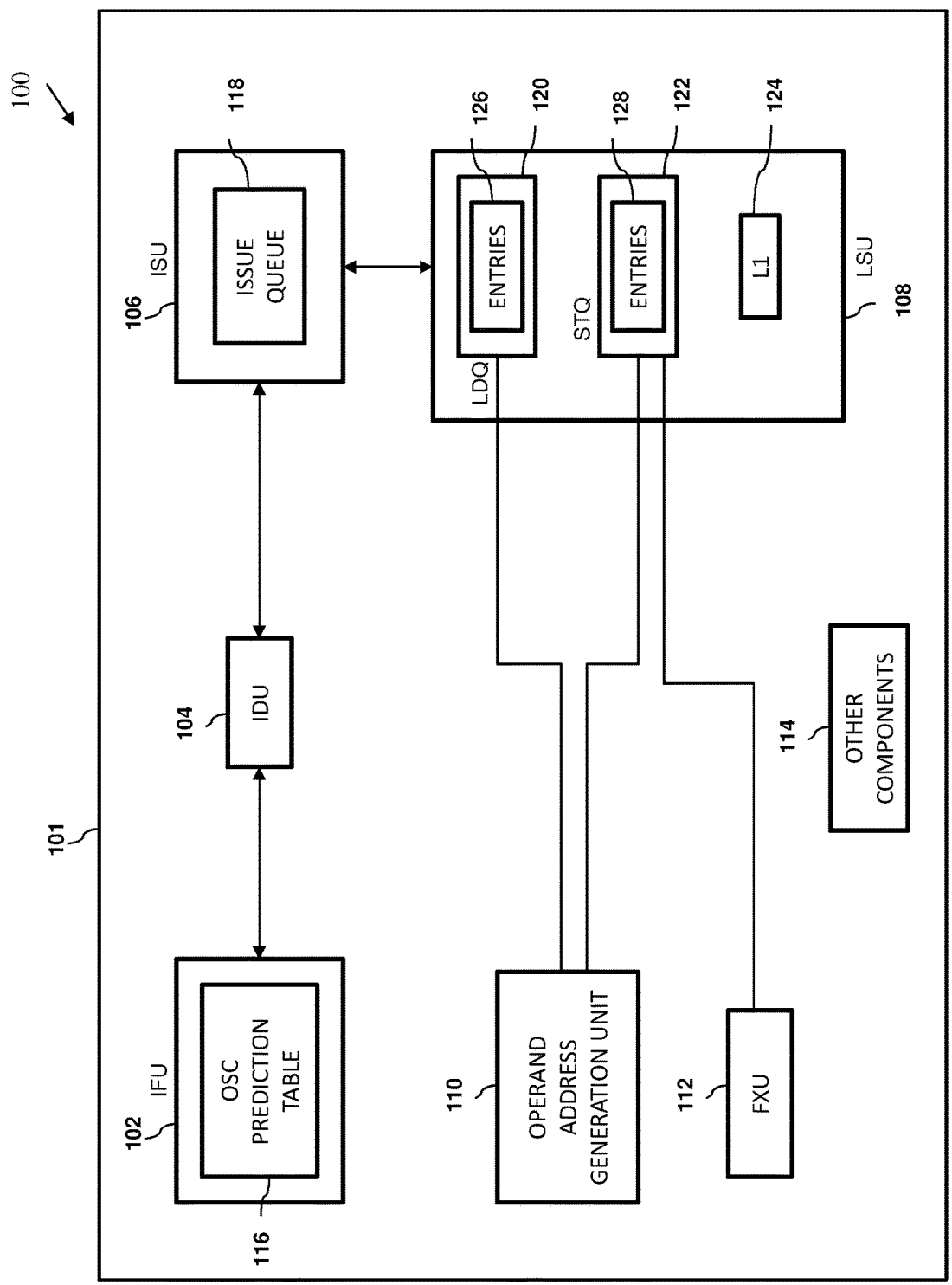
FIG. 1 depicts an operating environment upon which dynamically selecting an OSC hazard avoidance mechanism may be implemented according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of 8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Out of order (OOO) execution is a performance essential component of modern high frequency microprocessors. Executing instructions OOO allows for the processor to make progress on non-dependent functions in parallel instead of having to wait for a non-dependent instruction to finish. Dependency is based on the ordering of the instruction in the instruction stream, the sequential list of instructions to be executed based on the desired programs intent. A penalty to performance in OOO execution happens when instructions that are dependent are executed in such an order that violates the dependency chain.

There are two common types of instructions that frequently have dependency chains between each other: loads and stores. When a load and a store both need to use data that is located at the same address, the order in which the load and store are executed in the instruction stream needs to happen in a specific order to achieve the desired result. During the time that dependencies are determined there is not always complete information about the absolute address because the full address generation has not yet been completed, which can cause the dependency to be missed. These missed dependencies, called Operand Store Compare (OSC) Hazards, have the potential to drastically reduce the performance that a microprocessor gains from executing instructions OOO.

In order to mitigate the performance penalties, various prediction-based structures can be used in order to determine dependencies prior to the issuing of the instruction such that the load/store in question is issued correctly in relation to dependent instructions. These predictions can be classified into two groups: Static and Dynamic Detection.

Static OSC Detection (SOSC) occurs when a load/store instruction is decoded prior to issue. There is a side structure called the Dynamic Store Table (DST) that contains information about store instructions that are currently being executed. Every time a store is decoded information about that store is saved in an entry in the DST. When a younger load instruction is decoded the DST is queried to see if there are any stores that have exact matches to the data that is stored in the DST. If the load does have an exact match to this data, then a dependency is indicated such that during instruction issue these instructions are marked as dependent and will be issued accordingly.

Dynamic OSC Detection (DOSC) occurs during the execution of load/store instructions. DOSC addresses the cases where there is not an exact match in the decode data so the SOSC will not mark a dependency, but a dependency does exist. This can happen because there are multiple values that are added together to generate the final address and even if the values are different the sum of one set of three values can equal a different set of three values' sum. DOSC detection works by reading data from the OSC History Table (OHT), which is a structure that keeps track of previous instructions that were executed that did have an OSC event, which means that the OSC event was not predicted statically. If the OHT indicates that in the past the load/store in question was part of an OSC event, then during future decodes of that instruction the decode unit will mark that instruction with a DOSC marker. Thus, when a load is set to be sequenced to issue if the load has a DOSC marker it is checked with all older stores and will be marked as dependent on any older store that also has a DOSC marker and issued accordingly. The DOSC marking structure is imprecise in that a younger load is marked as dependent on all older stores that have the DOSC marking even if in reality it is not dependent on all of them, but just a single older store. Embodiments of the present invention can increase the precision with which DOSC mechanisms are applied.

Embodiments of the present invention involve the additional tracking in the OHT of a multiple dependencies indicator (MDI) (which may be referred to as an "MDI bit"). This can be a single bit that is tracked in the OHT alongside the other data, such as the Instruction Address (IA), OSC payload, and marked store table instruction address (MST IA). According to some embodiments, the IA is an address (or a portion of an address) in memory from which the instruction is fetched or read. In some embodiments, the OSC payload can provide an indication of whether there exists an OSC prediction that is associated with a store and/or load instruction. In some embodiments, the MST IA can be a tag that is based on a store instruction's IA that can be used to identify a store instruction upon which to make the load instruction dependent. The MDI bit acts as a valid bit for the MST IA. In other words, the state of the MDI bit determines whether to, for example, use the MST IA by applying an MST-based dependency OSC hazard avoidance mechanism or whether to apply for example, a DOSC hazard avoidance mechanism. According to some embodiments, the MST-based hazard avoidance mechanism may provide for a one to one correlation between dependent load and store instructions (e.g., the MST IA provides the address of the store upon which a load depends), whereas the DOSC hazard avoidance mechanism is a gross dependency marking where for example, one load can be dependent on multiple stores (e.g., the MST may provide the address of the most recent store instruction upon which the load instruction is found to be dependent) or where one store has multiple dependent victim loads. The MDI is set in cases where a single load has multiple store dependencies. This bit is transferred along with the other payload information to the decode unit (e.g., IDU 104) such that it is appropriately applied to the sequencing of the instructions during issue timeframe. The MDI bit provides benefits of helping to increase the performance of MST-based DOSC detection and reducing the number of duplicate entries needed in the OHT.

The benefit of using the MDI bit over conventional uses of DOSC detection is that it allows for loads that are truly dependent on a single store to be accurately handled. In the previous (non-MST) DOSC iterations a load that has a marker is made dependent on all surrounding stores that also have markers. This decreases performance by adding extra requirements to instruction sequencing at issue time that do not have true dependencies.

An MST IA implementation may be a dynamic OSC-avoidance mechanism that includes an OHT in which the OHT entries include an MST IA for the purposes of identifying a single store instruction on which a load instruction can become dependent. Without the MDI bit when an MST IA implementation is used the performance of the case of a single load having multiple store dependencies is significantly worse. This is because the MST IA pairs a single load to a single store for DOSC detection. In order for the MST implementation to handle this case it would need to create multiple entries for the same load, specifically one for each store pair. This is problematic because the OHT has a finite number of entries that can be read at one time and a finite number of entries that can be stored in total. In the first case if there were enough duplicates then creating a different OHT entry for each store would still not cover all the dependencies, which would lead to OSC events occurring and decreased performance. In addition, for a single load to need multiple entries for dependent stores means that information for fewer overall loads can be stored in the OHT. For workloads with lots of different load-store pairs this decreases overall performance.

FIG. 1 is a block diagram illustrating one example of an operating environment 100 applicable to one or more processes instructions and data in accordance with one or more embodiments of the present invention. The processor 101 comprises a single integrated circuit processor such as a superscalar processor, which, includes various execution units, registers, buffers, memories, and other functional units that are all formed by integrated circuitry. The processor 101, in one embodiment, is capable of issuing and executing instructions out-of-order.

The processor 101, in one embodiment, comprises an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, comprises an OHT 116 (which may also be referred to as an operand-store-compare (OSC) prediction table 116). The OSC prediction table 116 is discussed in greater detail below.

The issue unit 106, in this embodiment, comprises an issue queue 118. The LSU 108, in this embodiment, comprises a load queue (LDQ) 120, a store queue (STQ) 122, and an L1 cache 124. The LDQ 120 and the STQ 122 each comprise entries 126, 128, respectively, that track additional information associated with outstanding load and store instructions. According to some embodiments, the ISU 106 may use an OSC prediction to determine if the instructions the ISU 106 is going to issue out of order can be performed out of order by analyzing dependencies between the instructions. The OSC prediction provides a means to make two or more instructions dependent. It should be noted that various embodiments of the present invention are not limited to the configuration of the processor 101 as shown in FIG. 1. The embodiments of the present invention are applicable to a variety of architectures which can vary from the example shown in FIG. 1.

In general, the IFU 102 fetches instruction codes stored in an I-cache, which can be part of the L1 cache 124. These fetched instruction codes are decoded by the IDU 104 into instruction processing data. Once decoded, the instructions are dispatched and temporarily placed in an appropriate issue queue 118. The instructions are held in the issue queue 118 until all their required operands are available. From the issue queue(s) 118, instructions can be issued opportunistically to the execution units, e.g., LSU 108, FXU 112, etc., of the processor 100 for execution. In other words, the instructions can be issued out-of-order. The instructions, however, are maintained in the issue queue(s) 118 until execution of the instructions is complete, and the result data, if any, are written back, in case any of the instructions needs to be reissued.

During execution within one of the execution units 108, 112 an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

Figure 2:
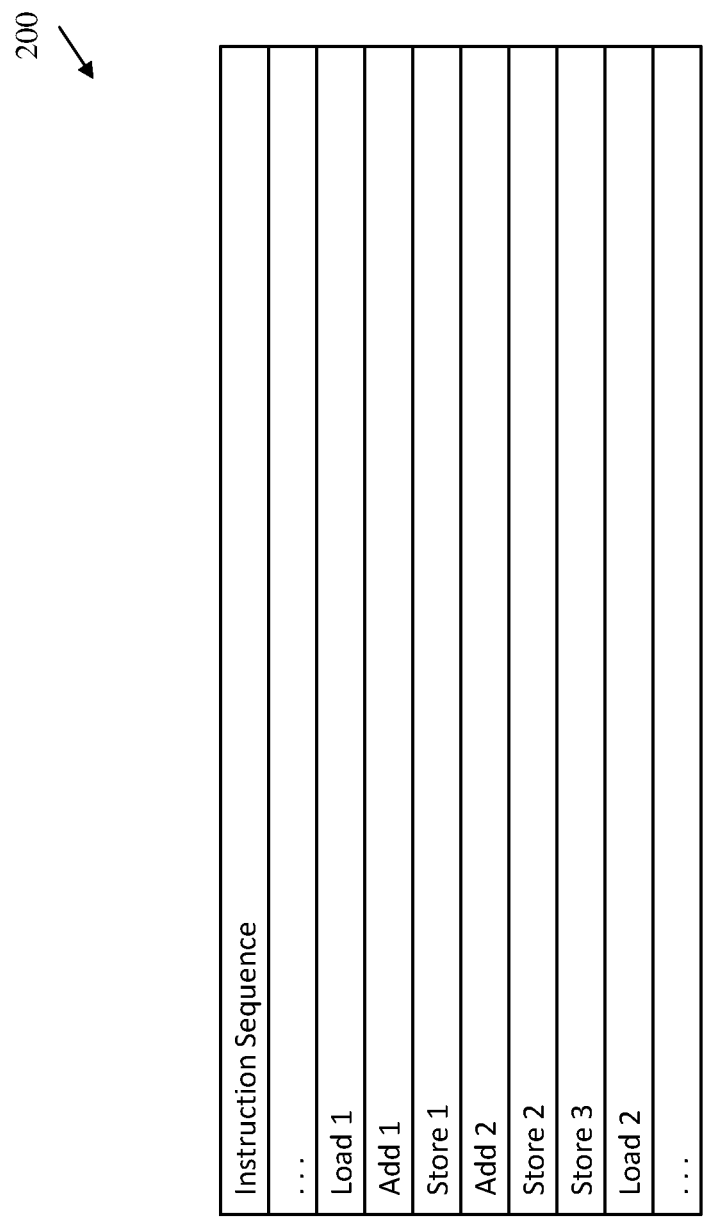
FIG. 2 depicts an example sequence of instructions according to one or more embodiments of the present invention.

FIG. 2 is an example of a very simple sequence of instructions 200. The instructions 200 in the figure have been listed in sequential order as they would appear in a sequence of code. Load 1 loads a value from memory into a register so that Add 1 can use that value to add an immediate value to. Then the result of that addition will be stored into memory by Store 1. Add 2 is using the same value brought in by Load 1 in a second addition operation. This second result will be stored to memory by Store 2. Store 3 is storing data to a different location based on the instruction sequence that happened prior to Load 1 and has no dependencies with the instructions listed in FIG. 2. Load 2 then would load the values stored by Store 1 and Store 2 from memory such that future instructions could then use those values. For the purposes of this example, it can be assumed that the SOSC does not detect these OSC events and that they are classified as DOSC.

These instructions in FIG. 2 were listed sequentially as they appear in the code that is being executed. Since they are configured to be executed on a machine that is issuing OOO they will not necessarily be issued in the order as given. But based on that order they have dependencies that if not honored will cause OSC events. From the loads and stores in FIG. 2 the dependencies between those loads and stores can be listed as such:

Load 1 is independent of the instructions listed.
Store 1 is dependent on Load 1.
Store 2 is dependent on Load 1.
Store 3 is independent of the instructions listed.
Load 2 is dependent on Store 1 and Store 2.

Embodiments of the present invention improve performance on OSC events generated by loads that are dependent on prior stores. This example illustrates how the implementation would handle the dependencies listed for Load 2.

The first time that Load 2 is executed, assuming that SOSC would not catch these OSC events, there will be no predicted OSC dependencies. With no known dependencies assume that Load 2 is issued in such a way that it causes an OSC event with Store 1. At completion time that OSC information is sent to be compared and potentially stored against the OHT.

Figure 3:
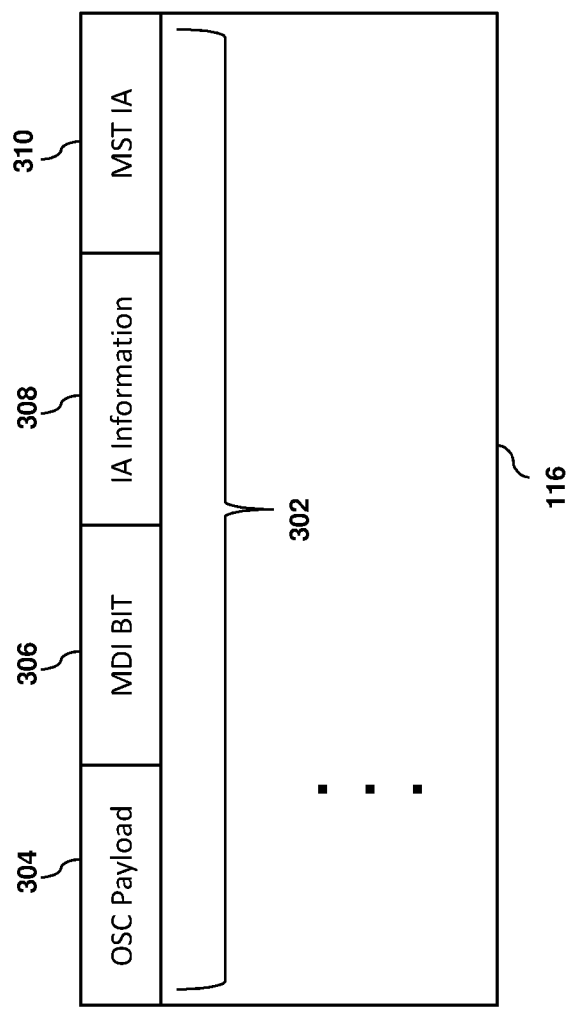
FIG. 3 depicts an example of an operand store compare history table (OHT) entry according to one or more embodiments of the present invention.

FIG. 3 shows an example OHT (which may also be referred to as an OSC prediction table) 116 configured to store one or more OHT entries 302. The OHT 116 contains entries for store instructions and load instructions that have caused OSC hazards in the past. The entries in the OHT 116 can be maintained using caching algorithms such as least recently used (LRU). The OHT 116 can be looked up by instruction address and provides OSC prediction information.

The OHT 116 can include a plurality of entries, such as entry 302 shown in FIG. 3. As described above, the OHT 116 may be configured to store a finite number of entries. According to some embodiments, each entry of the OHT 116 may be comprised of 16 bits. For example, in some embodiments, bits 0:1 may be an OSC payload 304, bit 2 may be an MDI bit 306, bits 3:11 may be Instruction Address (IA) information, and bits 12:15 may be an MST IA. According to some embodiments, the OSC payload 304 can be a 2-bit number that can be represented as, for example, (0,0), where the first bit represents an OSC prediction with respect to a store instruction and the second bit represents an OSC prediction with respect to a load instruction (or vice versa). Thus, in some embodiments, an OSC payload 304 of (0,1) may represent that there is an OSC prediction associated with a load instruction of the OHT entry, but there is not an OSC prediction associated with the store instruction of the OHT entry. According to some embodiments, the MDI bit 306 may correspond to the instruction that matches the IA Information 308 for the OHT entry and may identify how to process this instruction with regard to the MST IA 310 for a decode unit (e.g., IDU 104). According to some embodiments, the IA Information 308 may be information for identification of the specifics of the instruction such that a future instruction can be determined to be the same instruction through a comparison. According to some embodiments, the MST IA 310 may represent the MST IA of the culprit store for the instruction matching this IA Information 308. In other words, the MST IA can be used to cause an OHT-predicted load to become dependent upon a single OHT-predicted store with a matching IA (e.g., as reflected by block 612 in FIG. 6).

This information stored in an OHT entry 302 can be used to facilitate the correct issue order of instructions to maximize performance in terms of reducing the amount of OSC events that occur. The entry 302 can use the IA Information 308 to identify a specific instruction and indicates whether this instruction caused an OSC hazard in the past through the OSC payload 304 bits.

Referring back to the example shown in FIG. 2, the first time the load is executed there would be no prediction payload. However, because the first execution of this load instruction causes an OSC event due to a first dependency on the Store 1 instruction, the completion time payload has a non-zero load OSC payload. FIG. 4A shows the values of the bits in the OHT entry 302 associated with the Load 2 instruction after the first time the Load 2 instruction is issued. As shown in FIG. 4A, the OHT entry 302 indicates that the OSC Payload 304 has a value of 1 for a load OSC event (i.e., the OSC Payload 304 is (0,1)). The MDI bit is 0 which means that the MST IA 310 is valid to be used in future issuances of this instruction. The MST IA 310 that is sent to the OHT 116 for storage in this OHT entry 302 in this example is the IA for the oldest marked dependent store, which in this example is Store 1.

Now that there is a valid OHT entry for Load 2, whenever the processor executes this instruction again the information in that OHT entry 302 will be passed along as prediction time information to the decode and issue units. If the load in question were only dependent on a single store, then during subsequent issues the dependency would be noted by the OHT entry 302 as is without the need for modification. But in this example, as shown in FIG. 2, the code sequence includes a second Store, Store 2, which Load 2 is also dependent on.

During the second issuance of the Load 2 instruction, the Store 1 instruction will be marked as a dependency of Load 2, but Store 2 will not. In this case, there is a chance that during the sequencing of these instructions an OSC event will be caused based on Load 2's additional dependency on Store 2. The MDI bit 306 is particularly beneficial in this use case.

From the previous execution of the Load 2 instruction, the load bit of the OSC Payload 304 was 1, indicating an OSC event in the past. During this current execution of the Load 2 instruction, a second dependency is found between Load 2 and Store 2 and so the completion time OSC payload will also provide a value of 1 for the load payload, indicating the newly discovered dependency on Store 2. But now that there are multiple stores, with different MST IA values, a single MST IA is insufficient to prevent all of the potential OSC events. Accordingly, at this point, the system would place the MDI bit in a second state indicative of the fact that the instruction is associated with multiple dependencies (e.g., the MDI bit would be updated to store a value of 1). This updated MDI bit provides an indication to future issues of Load 2 that there are multiple culprit stores (i.e., store instructions upon which a load instruction is dependent) that this load is dependent on. This also does not require a second OHT entry to cover these multiple dependencies, as they are both covered by a single entry as listed in FIG. 4B.

FIG. 4B shows the values of some of the bits in the OHT entry 302 after the second time Load 2 is issued, according to an example embodiment. In comparison to FIG. 4A, the OSC payload 304 has remained the same to indicate that this instruction is still a load OSC event. The MST IA has been updated to the MST IA for Store 2 instead of the previous value of the MST IA for Store 1. The MDI bit 306 has also changed to a value of 1. According to some embodiments, this value of 1 can indicate that for future issues of Load 2, there is not a single store that this load is dependent on with a specific MST IA, but instead that this load is dependent on multiple stores and the sequencer needs to issue this load with that information available. This means that the dependent load, Load 2, needs to be issued after both Store 1 and Store 2.

The example provided by FIGS. 2, 4A and 4B show the benefits of use of the MDI bit 306. First, when there is only a single known store that a load is dependent on the MDI bit 306 indicates that the MST IA 310 is valid for that entry. That way during future issuances if there are independent store instructions that are part of the instruction sequence, such as Store 3, then Load 2 will not be marked dependent upon them and Load 2 can be issued quicker. Thus, embodiments of the invention provide a way to mark only the store instructions that are actually part of the dependency chain instead of marking them all, which increases performance. Secondly, in the case where there are multiple store culprits (e.g., Store 1 and Store 2) that a load instruction (e.g., Load 2) is actually dependent on, the MDI bit can allow for the OHT 116 to minimize the number of entries needed to track that information. The preceding example demonstrates this by virtue of the fact that following the second issuance of the Load 2 instruction, instead of creating an entirely separate OHT entry 302 for the new dependency with the Store 2 instruction, the system instead updates the MDI bit of the OHT entry 302 that was already created for the Store 1 Load 2 dependency. This allows for embodiments of the invention to minimize the need for OHT entries 302 that are created for the same load instruction and allows for the OHT 116 to hold predictions for a larger number of load/store instructions overall. By minimizing these near duplicate cases to a single-entry, performance is also increased overall by having more room to store OHT entries for different load/store instructions that cause OSC events.

Figure 5:
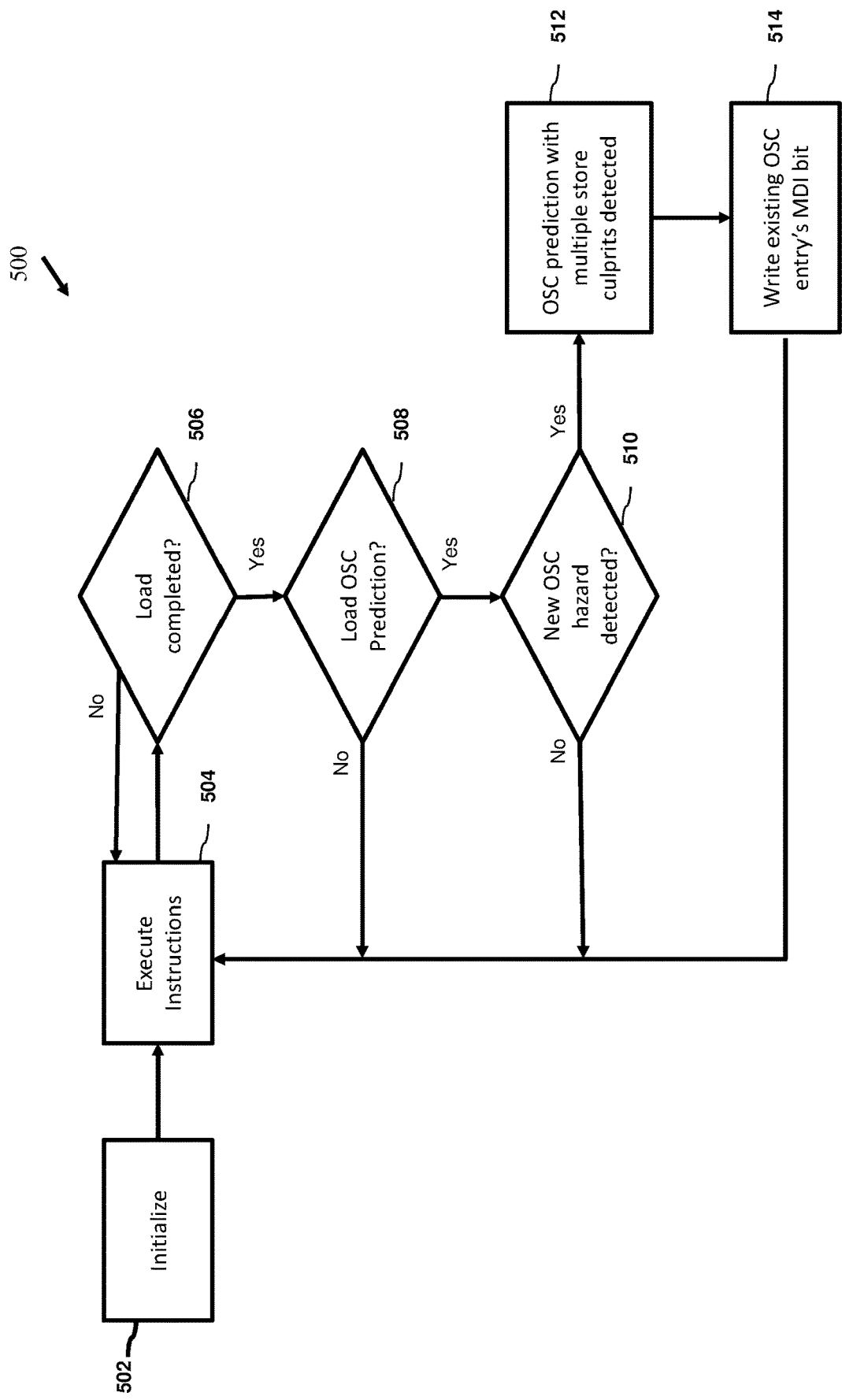
FIG. 5 depicts a flow diagram of a method for setting the MDI of an OHT entry according to one or more embodiments of the invention.

Turning now to FIG. 5, a flow diagram of a method 500 for dynamically setting the MDI of an OHT entry in accordance with an embodiment is shown. In one or more embodiments of the present invention, the method 500 may be embodied in software that is executed by computer elements described herein above and illustrated in FIG. 1. In other embodiments, the computer elements may reside on a computer system or processing system, such as the processing system 800 described herein below and illustrated in FIG. 8, or in some other type of computing or processing environment.

The method 500 begins at block 502 and includes initializing the MDI bit 306 of an OHT entry 302 by setting the bit to a state that is representative of a case where the instruction associated with the OHT entry 302 is indicated as not having multiple dependencies on other instructions (e.g., multiple store instructions). For example, the MDI bit 306 may be initially set to store a value of 0. According to some embodiments, initializing the MDI bit 306 can include setting the value of all MDI bit 306 of every OHT entry 302 in the OHT 116 to zero.

As shown at block 504, the method includes executing an instruction associated with an OHT entry 302. According to some embodiments, an instruction associated with the OHT entry 302 may be, for example, indicated by the IA Information 308 field of the OHT entry. According to some embodiments, the executed instruction may be a load instruction. As shown at block 506, the method includes determining whether the load operation of the executed load instruction has been completed. As will be understood by those of skill in the art, the system may determine if a load operation is complete by observing metadata generated during the course of the execution of the instruction. For example, in an out-of-order system, an instruction that was issued to an execution unit (e.g., a load issued form the ISU 106 to the LSU 108) may provide either a "finish" signal to the ISU 106 to indicate that instruction has completed execution or the ISU 106 may know that the instruction has finished after a number of cycles without receiving any feedback from the issued unit (e.g., the ISU 106 can know how many cycles after issue a load instruction would take to execute completely). In some embodiments, execution of a load instruction may involve obtaining the data at the specified address from memory (or local cache) and writing that data to a processor register. Completion of the load instruction may then occur as long as no hazards or exceptions were encountered during the most recent execution, and all older instructions had already completed.

If the load operation has not been completed, the method returns to block 504 to re-execute the load instruction. Once the load operation has been determined by have been completed, the method proceeds to block 508 where the system determines whether the executed instruction is associated with a load OSC prediction. In other words, the system determines whether the OHT entry 302 associated with the executed instruction stores a load OSC prediction in the OSC payload 304. For example if the OSC Payload 304 is (0,1) or (1,1), then the system may determine that the executed instruction has a load OSC prediction, as the load OSC prediction bit storing a value of 1 indicates that a previous load-based OSC event has been detected, which also provides an indication that the executed instruction has been previously issued before and the current issuance of the instruction may be a second (or greater) issuance. If the system determines that the executed instruction does not have an associated load OSC prediction (e.g., the load OSC prediction bit of the OSC payload 304 stores a value of 0), then the method returns to block 504 to execute further instructions. If the system determines that the executed instruction does have an associated load OSC prediction, then the method proceeds to block 510, where the method determines whether a new OSC hazard has been detected. Similar to the example described above with respect to FIGS. 4A and 4B, during this second issuance of the instruction the system may encounter a second dependency (e.g., similar to the discovery that Load 2 is dependent on Store 2 above) in response to determining that a new OSC hazard has occurred. If, at block 510, the system determines that no new OSC hazard has been detected, the method proceeds back to block 504 to execute further instructions, however, if at block 510, the system determines that a new OSC hazard has been detected, the method proceeds to block 512, where the system determines that a new OSC prediction with multiple store culprits has been detected. In other words, at block 512, the system can determine that the executed load instruction is dependent on more than one store instruction. According to some embodiments, the system may update the MST IA 310 of the OHT entry 302 associated with the instruction to store the MST IA for the store instruction that is associated with the newly detected OSC hazard. The method may proceed to block 514, where the system may update the MDI bit 306 to place the MDI in a state that represents that the associated load instruction is dependent on more than one store instruction. For example, according to some embodiments, the system may change the MDI bit 306 from 0 to 1, similar to the example shown in FIG. 4B. As will be described below, this dynamic changing/setting of the MDI bit 306 can be utilized by the system to provide an appropriate OSC hazard avoidance mechanism.

Figure 6:
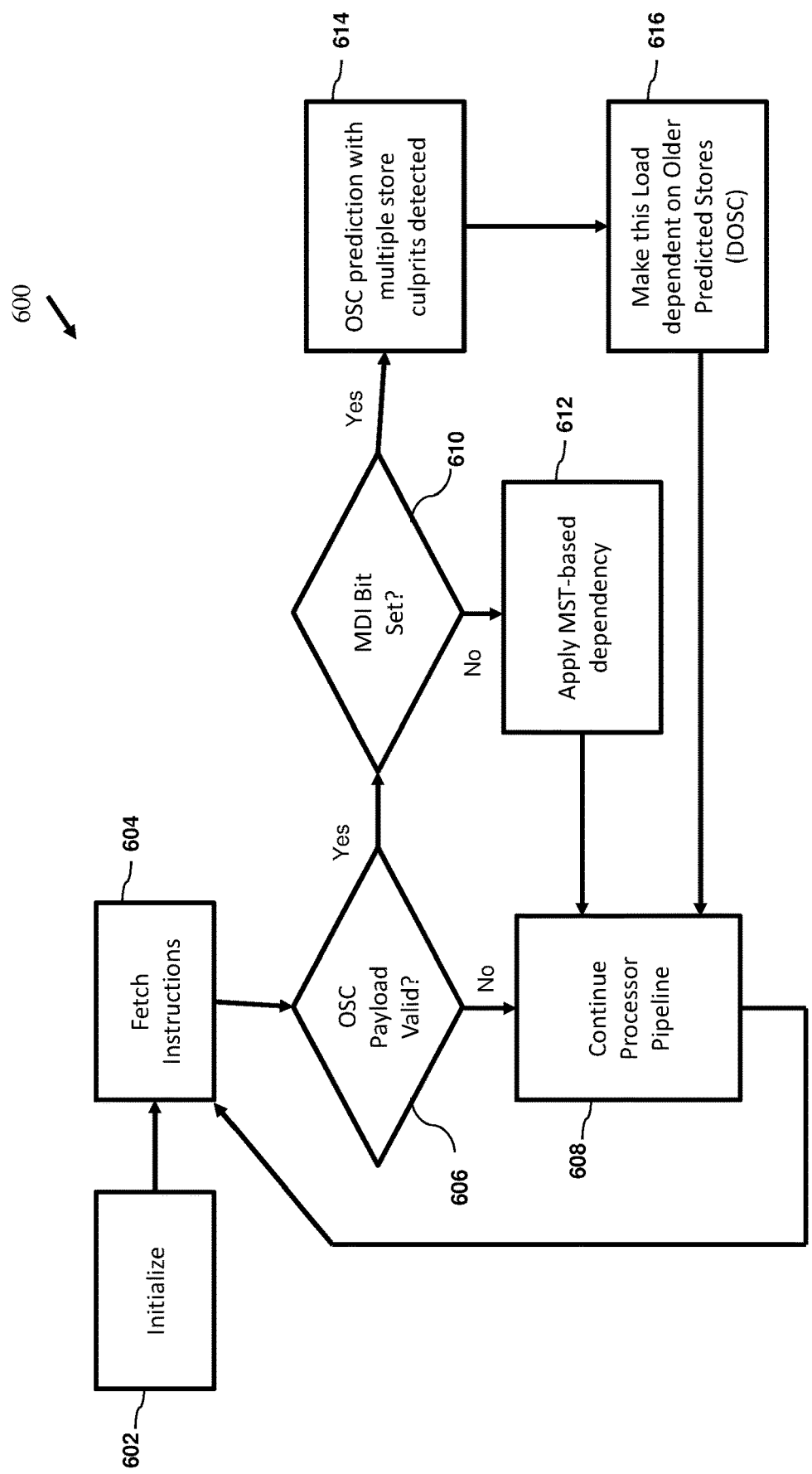
FIG. 6 depicts a flow diagram of a method for using the MDI of an OHT entry according to one or more embodiments of the invention.

Turning now to FIG. 6, a flow diagram of a method 600 for using the MDI 306 of an OHT entry 302 in accordance with an embodiment is shown. In one or more embodiments of the present invention, the method 600 may be embodied in software that is executed by computer elements described herein above and illustrated in FIG. 1. In other embodiments, the computer elements may reside on a computer system or processing system, such as the processing system 800 described herein below and illustrated in FIG. 8, or in some other type of computing or processing environment.

The method 600 begins at block 602 and includes initializing the value of the MDI bit 306 of all OHT entries 302 of an OHT 116 to have a value of zero (or a value that otherwise indicates that an instruction associated with the OHT entry is not indicated to have multiple dependencies on other instructions).

As shown at block 604, the method includes fetching instructions 604. For example, instructions associated with an OHT entry 302 may be fetched from an address specified in a current program status word (PSW) and proceeds sequentially through memory. According to some embodiments, the OHT 116 can be independently accessed in parallel to fetching an instruction cache, but indexed as a function of the same instruction address used to index the instruction cache. The index into the instruction cache can return a line's worth of instruction text and the index into the OHT 116 can return metadata (e.g., OSC prediction info) that is associated with the same line of instruction text. According to some embodiments, the fetched instructions may be instructions for a load operation. At block 606, the method includes determining whether there is a valid OSC Payload 304 in the OHT entry 302 associated with the fetched instruction. According to some embodiments, determining that there is a valid OSC Payload can include determining that the OSC Payload 304 bit associated with the load instruction is in a state that indicates there is a stored OSC prediction associated with the load instruction. For example, according to some embodiments, an OSC Payload 304 of (1,1) or (0,1) can indicate the presence of a stored OSC prediction associated with the load instruction. If the system determines that there is not a valid OSC Payload associated with the load instruction (i.e., the OSC Payload 304 bit associated with the load instruction is in a state that indicates there is no associated OSC prediction), then the method may proceed to block 608, where the system continues the processor pipeline and executes the load instruction (e.g., via LSU 108). If the system determines that the load instruction does have an associated valid OSC payload, then the method may proceed to block 610, where the system determines whether the MDI bit 306 of the OHT entry 302 associated with the load instruction is set. In other words, the system determines whether the MDI bit 306 is in a state that indicates the load instruction is dependent on multiple store instructions (e.g., the MDI bit 306 is stores a value of 1) or whether the MDI bit 306 is in a state that indicates that the load instruction is not known to be dependent on multiple store instructions (e.g., the MDI bit stores a value of 0). According to some embodiments, if the system determines that the MDI bit is not set (i.e., that it indicates the load instruction is not known to be dependent on multiple store instructions), the method proceeds to block 612 where the system applies a first OSC hazard avoidance mechanism. In some embodiments, the first OSC hazard avoidance mechanism may be a MST-based dependency mechanism, as described in the co-owned patent application titled "Making Precise Operand-Store-Compare Predictions to Avoid False Dependencies" by Gregory William Alexander et al., filed concurrently herewith as application Ser. No. 16/358,791, the contents of which are herein incorporated by reference. Following the application of the first OSC hazard avoidance mechanism at block 612, the method proceeds to block 608 to continue execution of instructions in the processor pipeline. If the system determines that the MDI bit 306 is set (e.g., the MDI bit 306 stores a value of 1), then the method proceeds to block 614 where the system determines that the instruction is associated with an OSC prediction with multiple store culprits detected. In other words, the system determines that the load instruction is dependent on multiple store instructions. At block 616, the method includes applying a second OSC hazard avoidance mechanism. For example, the second OSC hazard avoidance mechanism may include making the load instruction dependent on older predicted store instructions and applying the DOSC hazard avoidance mechanism described previously above. In this way, the system can dynamically change the OSC hazard avoidance mechanism utilized by the system based on the state of the MDI bit 306 associated with the load instruction, which indicates whether the load instruction has been determined to be dependent on multiple store instructions. As will be understood by those of skill in the art, the MST-based OSC hazard avoidance mechanism is advantageous for use in cases where the load instruction is dependent on a single store instruction, whereas in a case where the load instruction has multiple dependencies, the DOSC OSC hazard avoidance mechanism is better suited to provide effective OSC avoidance. Accordingly, the use of the MDI bit 306 to allow dynamic selection of the OSC hazard avoidance mechanism may improve the overall performance of the system.

Figure 7:
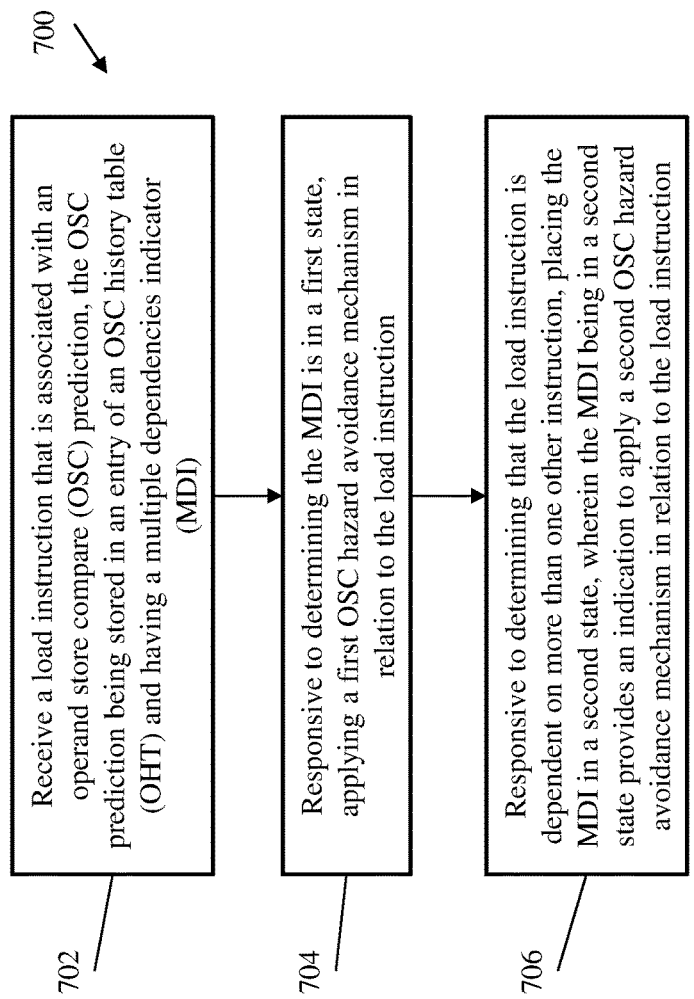
FIG. 7 depicts a flow diagram of a method for dynamically selecting an OSC hazard avoidance mechanism according to one or more embodiments of the invention.

Turning now to FIG. 7, a flow diagram of a method 700 for dynamically selecting an OSC hazard avoidance mechanism in accordance with an embodiment is shown. In one or more embodiments of the present invention, the method 700 may be embodied in software that is executed by computer elements described herein above and illustrated in FIG. 1. In other embodiments, the computer elements may reside on a computer system or processing system, such as the processing system 800 described herein below and illustrated in FIG. 8, or in some other type of computing or processing environment.

The method 700 begins at block 702 and includes receiving a load instruction that is associated with an operand store compare (OSC) prediction. According to some embodiments, the OSC prediction is stored in an entry of an OSC history table (OHT) and includes a multiple dependencies indicator (MDI). According to some embodiments, the OSC prediction may refer to the entirety of the OHT entry 302 or in some contexts an OSC prediction may refer to the values of the OSC Payload 304. In some embodiments, the MDI is a single bit, the first state is represented by the MDI having a stored value of zero and the second state is represented by the MDI having a stored value of one. In some embodiments, the first state may be represented by the MDI having a stored value of one whereas the second state may be represented by the MDI having a stored value of zero. According to some embodiments, the OSC prediction can represent an indication that the load instruction is dependent on a first store instruction. For example, as described above with respect to FIG. 4A, in some embodiments an OSC Payload 304 may indicate that an OSC prediction is present for a load instruction if the payload bit associated with the load operation is in a state that indicates the presence of an OSC prediction (e.g., if the OSC Payload 304 is (0,1) or (1,1)).

According to some embodiments the MDI can be one bit of an entry of the OHT that is associated with the load instruction. In some embodiments, the entry of the OHT that is associated with the load instruction can be made comprised of 16 bits. In some embodiments, the entry of the OHT that is associated with the load instruction can include a two-bit OSC payload 304, nine bits of IA Information 308 and four bits of MST IA 310. In some embodiments, the MDI 306 can provide an instruction to a decode unit (e.g., IDU 104) representative of a selected OSC hazard avoidance method of handling the MST IA payload (i.e., the data stored by the MST IA bits that provides an instruction address (or portion thereof) of the culprit store associated with this OHT entry). For example, in a MST-based dependency hazard avoidance mechanism, the MST IA may be used to select a particular culprit store upon which the load will become dependent, whereas in a DOSC hazard avoidance mechanism the MST IA may store a most recent culprit store of a plurality of culprit stores upon which the load is dependent.

As shown at block 704, the method includes applying a first OSC hazard avoidance mechanism in relation to the load instruction in response to determining the MDI is in a first state. According to some embodiments, the first OSC hazard avoidance mechanism can be a MST-based hazard avoidance mechanism, as described above with respect to FIG. 6.

As shown at block 706, the method includes placing the MDI in a second state in response to determining that the load instruction is dependent on more than one store instruction. According to some embodiments, the MDI being in the second state provides an indication to apply a second OSC hazard avoidance mechanism in relation to the load instruction. According to some embodiments, the second OSC hazard avoidance mechanism can be a multiple culprit OSC hazard avoidance mechanism, such as a DOSC OSC hazard avoidance mechanism described above, or an embodiment of an SOSC mechanism that is designed as a multiple culprit mechanism. It will be understood by those of skill in the art, that a multiple culprit hazard avoidance mechanism is a hazard avoidance method that is designed to handle situations where an instruction (e.g., a load instruction) is dependent on multiple other instructions (e.g., multiple different store instructions). In some embodiments, determining that the instruction is dependent on more than one other instruction can include detecting a first OSC hazard event following a first execution of the load instruction, updating an OSC payload bit of the entry of the OHT associated with the load instruction to reflect the detection of the first OSC hazard and detecting a second OSC hazard event following a second execution of the load instruction.

Additional processes may also be included. It should be understood that the processes depicted in FIGS. 5, 6 and 7 represent illustrations, and that other processes may be added or existing processes may be removed, modified, or rearranged without departing from the scope and spirit of the present disclosure.

Figure 8:
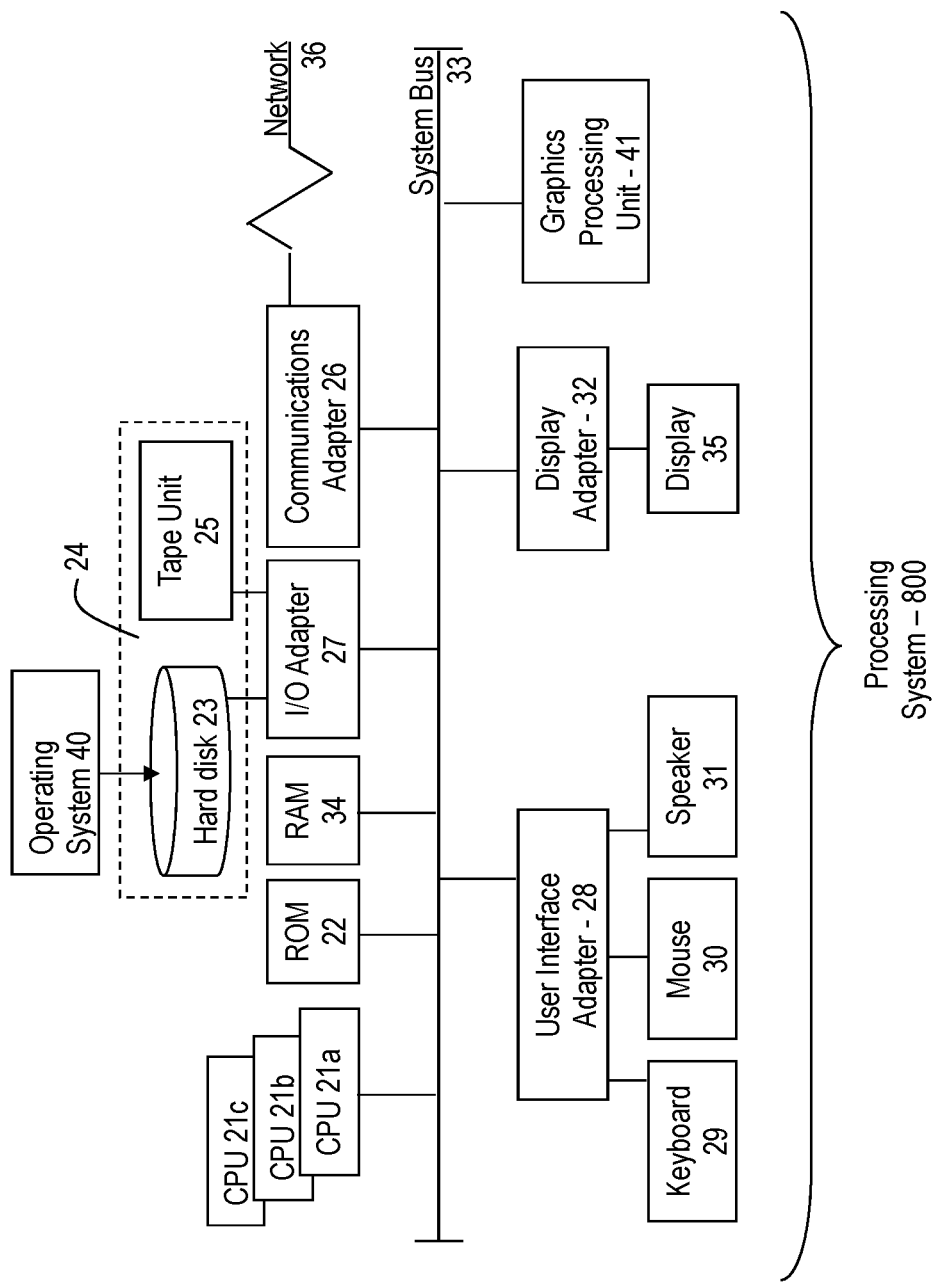
FIG. 8 depicts a block diagram of a computer system for use in implementing one or more embodiments of the present invention.

Referring to FIG. 8, there is shown an embodiment of a processing system 800 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 800.

FIG. 8 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 800 may be stored in mass storage 24. A network adapter 26 interconnects bus 33 with an outside network 36 enabling data processing system 800 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 800 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 8, the system 800 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a load instruction that is associated with an operand store compare (OSC) prediction, the OSC prediction being stored in an entry of an OSC history table (OHT) and having a multiple dependencies indicator (MDI) also stored in the entry of the OHT, the load instruction added to the OHT in response to detecting, during a previous execution of the load instruction, a dependency between the load instruction and a first store instruction, the OHT comprising a single entry for the load instruction;
responsive to determining that the MDI is in a first state, applying a first OSC hazard avoidance mechanism in relation to the load instruction that establishes a dependency of the load instruction on a single store instruction in the OHT, the single store instruction being the first store instruction; and
responsive to determining that the load instruction is dependent on more than one store instruction in the OHT including the first store instruction and a second store instruction, placing the MDI in a second state, wherein the MDI being in the second state provides an indication to apply a second OSC hazard avoidance mechanism in relation to the load instruction that establishes a dependency of the load instruction on all stores in the OHT that are older than the load instruction including the first store instruction, the second store instruction, and an additional store instruction in the OHT that was not identified by the determining that the load instruction is dependent on more than one store instruction in the OHT.

2. The computer-implemented method of claim 1, wherein the MDI comprises a single bit, the first state comprises the MDI having a stored value of zero and the second state comprises the MDI having a stored value of one.

3. The computer-implemented method of claim 1, wherein the first OSC hazard avoidance mechanism comprises a marked store table (MST)-based OSC hazard avoidance mechanism.

4. The computer-implemented method of claim 1, wherein the second OSC hazard avoidance mechanism comprises a multiple culprit OSC hazard avoidance mechanism.

5. The computer-implemented method of claim 1, wherein the MDI comprises one bit of an entry of the OHT that is associated with the load instruction.

6. The computer-implemented method of claim 5, wherein the entry of the OHT that is associated with the load instruction comprises 16 bits.

7. The computer-implemented method of claim 6, wherein the entry of the OHT that is associated with the load instruction comprises a two-bit OSC payload, nine bits of instruction address (IA) information and four bits of the MST IA.

8. The computer-implemented method of claim 7, wherein the MDI provides an instruction to a decode unit representative of a selected method of handling an MST IA payload.

9. The computer-implemented method of claim 1, wherein determining that the instruction is dependent on more than one other instruction comprises:
detecting a first OSC hazard event following a first execution of the load instruction;
updating an OSC payload bit of the entry of the OHT associated with the load instruction to reflect the detection of the first OSC hazard; and
detecting a second OSC hazard event following a second execution of the load instruction.

10. A system comprising:
a processor communicatively coupled to a memory, the processor configured to:
receive a load instruction that is associated with an operand store compare (OSC) prediction, the OSC prediction being stored in an entry of an OSC history table (OHT) and having a multiple dependencies indicator (MDI) also stored in the entry of the OHT, the load instruction added to the OHT in response to detecting, during a previous execution of the load instruction, a dependency between the load instruction and a first store instruction, the OHT comprising a single entry for the load instruction;
responsive to determining that the MDI is in a first state, apply a first OSC hazard avoidance mechanism in relation to the load instruction that establishes a dependency of the load instruction on a single store instruction in the OHT, the single store instruction being the first store instruction; and
responsive to determining that the load instruction is dependent on more than one store instruction in the OHT including the first store instruction and a second store instruction, place the MDI in a second state, wherein the MDI being in the second state provides an indication to apply a second OSC hazard avoidance mechanism in relation to the load instruction that establishes a dependency of the load instruction on all stores in the OHT that are older than the load instruction including the first store instruction, the second store instruction, and an additional store instruction in the OHT that was not identified by the determining that the load instruction is dependent on more than one store instruction in the OHT.

11. The system of claim 10, wherein the MDI comprises a single bit, the first state comprises the MDI having a stored value of zero and the second state comprises the MDI having a stored value of one.

12. The system of claim 10, wherein the first OSC hazard avoidance mechanism comprises a marked store table (MST)-based OSC hazard avoidance mechanism.

13. The system of claim 10, wherein the second OSC hazard avoidance mechanism comprises a multiple culprit OSC hazard avoidance mechanism.

14. The system of claim 10, wherein the MDI comprises one bit of an entry of the OHT that is associated with the load instruction.

15. A computer program product comprising a computer readable storage medium having program instructions embodied therewith the program instructions executable by a computer processor to cause the computer processor to perform a method comprising:
  receiving a load instruction that is associated with an operand store compare (OSC) prediction, the OSC prediction being stored in an entry of an OSC history table (OHT) and having a multiple dependencies indicator (MDI) also stored in the entry of the OHT, the load instruction added to the OHT in response to detecting, during a previous execution of the load instruction, a dependency between the load instruction and a first store instruction, the OHT comprising a single entry for the load instruction;
  responsive to determining that the MDI is in a first state, applying a first OSC hazard avoidance mechanism in relation to the load instruction that establishes a dependency of the load instruction on a single store instruction in the OHT, the single store instruction being the first store instruction; and
  responsive to determining that the load instruction is dependent on more than one store instruction in the OHT including the first store instruction and a second store instruction, placing the MDI in a second state, wherein the MDI being in the second state provides an indication to apply a second OSC hazard avoidance mechanism in relation to the load instruction that establishes a dependency of the load instruction on all stores in the OHT that are older than the load instruction including the first store instruction, the second store instruction, and an additional store instruction in the OHT that was not identified by the determining that the load instruction is dependent on more than one store instruction in the OHT.

16. The computer program product of claim 15, wherein the MDI comprises a single bit, the first state comprises the MDI having a stored value of zero and the second state comprises the MDI having a stored value of one.

17. The computer program product of claim 15, wherein the first OSC hazard avoidance mechanism comprises a marked store table (MST)-based OSC hazard avoidance mechanism.

* * * * *